United States Patent
Nelson et al.

(10) Patent No.: US 7,244,930 B2
(45) Date of Patent: Jul. 17, 2007

(54) RADIATION DETECTION METHOD AND SYSTEM USING THE SEQUENTIAL PROBABILITY RATIO TEST

(75) Inventors: Karl E. Nelson, Livermore, CA (US); John D. Valentine, Redwood City, CA (US); Brock R. Beauchamp, San Ramon, CA (US)

(73) Assignee: The Regents of the University of California, Oakland, CA (US)

( * ) Notice: Subject to any disclaimer, the term of this patent is extended or adjusted under 35 U.S.C. 154(b) by 204 days.

(21) Appl. No.: 11/205,921

(22) Filed: Aug. 15, 2005

(65) Prior Publication Data
US 2007/0018090 A1    Jan. 25, 2007

Related U.S. Application Data

(60) Provisional application No. 60/601,351, filed on Aug. 13, 2004.

(51) Int. Cl.
*G01D 18/00* (2006.01)

(52) U.S. Cl. .................................. 250/252.1

(58) Field of Classification Search ............... 250/200, 250/252.1
See application file for complete search history.

(56) References Cited

U.S. PATENT DOCUMENTS

2002/0188423 A1* 12/2002 Gross et al. ............... 702/182

* cited by examiner

*Primary Examiner*—David Porta
*Assistant Examiner*—Mark R Gaworecki
(74) *Attorney, Agent, or Firm*—James S. Tak; John H. Lee (57) ABSTRACT

A method and system using the Sequential Probability Ratio Test to enhance the detection of an elevated level of radiation, by determining whether a set of observations are consistent with a specified model within a given bounds of statistical significance. In particular, the SPRT is used in the present invention to maximize the range of detection, by providing processing mechanisms for estimating the dynamic background radiation, adjusting the models to reflect the amount of background knowledge at the current point in time, analyzing the current sample using the models to determine statistical significance, and determining when the sample has returned to the expected background conditions.

29 Claims, 3 Drawing Sheets

RADIATION DETECTION METHOD AND SYSTEM USING THE SEQUENTIAL PROBABILITY RATIO TEST

I. CLAIM OF PRIORITY IN PROVISIONAL APPLICATION

This application claims priority in provisional application No. 60/601,351 filed on Aug. 13, 2004, entitled "SPRT for Radiation Detection Over Distance and in Urban Environments," by Karl E. Nelson et al.

The United States Government has rights in this invention pursuant to Contract No. W-7405-ENG-48 between the United States Department of Energy and the University of California for the operation of Lawrence Livermore National Laboratory.

II. FIELD OF THE INVENTION

The present invention relates to radiation detectors and detection methods, and more particularly to a radiation detection system and method using the Sequential Probability Ratio Test to increase the detection range of a moving source, enhance detection sensitivity, and minimize false trigger events in dynamic background conditions such as in urban environments.

III. BACKGROUND OF THE INVENTION

The Sequential Probability Ratio Test (SPRT) is a known Bayesian sequential analysis technique for hypothesis testing, i.e. for determining whether a set of observations are consistent with a specified model (i.e. a hypothesis) within a given bounds of statistical significance. In particular, the SPRT makes a binary decision between two statistical models to determine which model best represents the data to a required level of statistical confidence. This binary decision is optimum in the sense that it minimizes the required number of samples to make such a determination. The SPRT mathematical technique was originally developed by A. Wald in 1947 for process control testing in manufacturing. The test enabled quality control personnel to sample a production lot with as few samples as possible in order to make a determination as to whether or not the lot was faulty (with some degree of confidence).

For applications involving radiation detection, the SPRT has been applied to detect a deviation from a background radiation level with as few samples as possible. For example, the SPRT has been used in radiation detection applications to reduce the time that a subject (e.g. a package in a portal monitoring scenario) is screened until it is determined to be safe or unsafe (see for example, *"Sequential Probability Ratio Controllers for Safeguards Radiation Monitors"* by P. E. Fehlau (1984), using Gaussian statistics). Count samples are produced from a radiation detector, such as for example, a scintillator or NaI detector, at regular intervals. The SPRT operates to find the minimum number of observations (i.e. count samples) in a maximum allowable screening time before the safe/unsafe determination is made, and either an alarm is triggered or the subject is safely released to screen the next subject.

In the case, however, of a moving radiation source over distance, radiation detection can be a difficult problem because the signals of interest are often buried in the natural background noise. This is especially true in the case where the radiation source is not well confined, such as for example over a body of water. In such cases, reliance on a single parameter set becomes impossible, and without the aid of presence detectors, it is difficult to determine "a priori" the length of time window for which data should be acquired. Performing an evaluation based on too large of a detection window can result in increased background noise. On the other hand, too short a detection window can reduce the statistical significance of the measurement. Previous systems have addressed this problem by assuming the motion of the source at the site, and then optimizing the time window to make the determination. As the potential speed of the target to be monitored/detected increases, or the distance to the target decreases, the time windows must be reduced. And another problem is encountered when performing radiation detection in dynamic background conditions such as urban environments, where incorrect trigger events are common due to the shielding of background radiation by large trucks and the subsequent rebound in the radiation level after their departure.

In summary, what is still needed is a radiation detection method utilizing the SPRT process, but particularly tailored for application to moving sources as a means of increasing detection range, as well as increasing detection sensitivity, i.e. decreasing the amount of source material required to trigger.

IV. SUMMARY OF THE INVENTION

One aspect of the present invention includes a method for detecting an elevated level of background radiation, comprising: obtaining a current sample using a radiation detector; computing at least one background radiation estimate(s); setting one of the at least one background radiation estimate(s) ($W_k(n)$) as a first model (M0), and the combination of M0 and an offset as a second model (M1); using the SPRT to test the current sample against M0 and M1 to produce a log-likelihood ratio contribution of the current sample; updating the log-likelihood ratio by adding the log-likelihood ratio contribution to a previous log-likelihood ratio; and upon determining that the updated log-likelihood ratio (R) is greater than a predefined upper limit threshold (B), triggering an alarm indicating an elevated level of background radiation.

Another aspect of the present invention includes a method for obtaining a statistically significant background radiation estimate for use in radiation detection, comprising: controlling a radiation detector to obtain a current sample; computing the total number of counts over a first rolling window (W1) prior to the current sample, and the total number of counts over a second rolling window (W2) larger than W1 prior to the current sample and excluding periods where a trigger occurred; and using the SPRT to determine which of W1 and W2 is the more statistically significant background radiation estimate for use as a sampled background estimate against which a sample observation may be compared to determine a triggering event.

Another aspect of the present invention includes a method for clearing a currently triggered state of a radiation detection system of a type using SPRT analysis to update a log-likelihood ratio (R) based on a ratio contribution of a sample observation, comprising: tracking the maximum ($R_{max}$) of the updated log-likelihood ratio R; and upon a determination that $R < R_{max} - C$ where C is a predefined value, ending the triggered state and resetting the SPRT.

Another aspect of the present invention includes a computer program product comprising: a computer useable medium and computer readable code embodied on said computer useable medium for causing a detection of an elevated level of background radiation, the computer readable code comprising: computer readable program code means for causing a computer to obtain a current sample using a radiation detector; computer readable program code means for causing a computer to compute at least one background radiation estimate(s); computer readable program code means for causing a computer to set one of the at least one background radiation estimate(s) ($W_k(n)$) as a first model (M0), and the combination of M0 and an offset as a second model (M1); computer readable program code means for causing a computer to use the SPRT to test the current sample against M0 and M1 to produce a log-likelihood ratio contribution of the current sample; computer readable program code means for causing a computer to update the log-likelihood ratio by adding the log-likelihood ratio contribution to a previous log-likelihood ratio; and computer readable program code means for causing a computer to, upon determining that the updated log-likelihood ratio (R) is greater than a predefined upper limit threshold (B), triggering an alarm indicating an elevated level of background radiation.

Another aspect of the present invention includes a computer program product comprising: A computer useable medium and computer readable code embodied on said computer useable medium for causing a statistically significant background radiation estimate to be obtained for use in radiation detection, the computer readable code comprising: computer readable program code means for causing a computer to control a radiation detector to obtain a current sample; computer readable program code means for causing a computer to compute the total number of counts over a first rolling window (W1) prior to the current sample, and the total number of counts over a second rolling window (W2) larger than W1 prior to the current sample and excluding periods where a trigger occurred; and computer readable program code means for causing a computer to use the SPRT to determine which of W1 and W2 is the more statistically significant background radiation estimate for use as a sampled background estimate against which a sample observation may be compared to determine a triggering event.

Another aspect of the present invention includes a computer program product comprising: a computer useable medium and computer readable code embodied on said computer useable medium for causing the clearing of a currently triggered state of a radiation detection system of a type using SPRT analysis to update a log-likelihood ratio (R) based on a ratio contribution of a sample observation, the computer readable code comprising: computer readable program code means for causing a computer to track the maximum ($R_{max}$) of the updated log-likelihood ratio R; and computer readable program code means for causing a computer to, upon a determination that $R<R_{max}-C$ where C is a predefined value, end the triggered state and reset the SPRT.

Another aspect of the present invention includes a computer system for detecting an elevated level of background radiation, comprising: a first processor module that obtains current sample data from a radiation detector; a second processor module that computes at least one background radiation estimate(s); a third processor module that sets one of the at least one background radiation estimate(s) ($W_k(n)$) as a first model (M0), and the combination of M0 and an offset as a second model (M1); a fourth processor module that uses the SPRT to test the current sample against M0 and M1 to produce a log-likelihood ratio contribution of the current sample; a fifth processor module that updates the log-likelihood ratio by adding the log-likelihood ratio contribution to a previous log-likelihood ratio; and a sixth processor module that, upon determining that the updated log-likelihood ratio (R) is greater than a predefined upper limit threshold (B), triggers an alarm indicating an elevated level of background radiation.

Another aspect of the present invention includes a computer system for obtaining a statistically significant background radiation estimate for use in radiation detection, comprising: a first processor module for controlling a radiation detector to obtain a current sample; a second processor module for computing the total number of counts over a first rolling window (W1) prior to the current sample, and the total number of counts over a second rolling window (W2) larger than W1 prior to the current sample and excluding periods where a trigger occurred; and a third processor module using the SPRT to determine which of W1 and W2 is the more statistically significant background radiation estimate for use as a sampled background estimate against which a sample observation may be compared to determine a triggering event.

Another aspect of the present invention includes a computer system for clearing a currently triggered state of a radiation detection system of a type using SPRT analysis to update a log-likelihood ratio (R) based on a ratio contribution of a sample observation, comprising: a first processor module for tracking the maximum ($R_{max}$) of the updated log-likelihood ratio R; and a second processor module that, upon a determination that $R<R_{max}-C$ where C is a predefined value, ends the triggered state and resetting the SPRT.

V. BRIEF DESCRIPTION OF THE DRAWINGS

The accompanying drawings, which are incorporated into and form a part of the disclosure, are as follows:

FIG. 1 is a flow chart diagram of a first exemplary embodiment of the present invention, and in particular a radiation detection process using the SPRT to trigger an alarm upon detecting a statistically significant elevated level of background radiation. FIG. 1 also shows use of a dynamic adjustment of the background estimate to compensate for decreasing uncertainty in the estimate as more data is assimilated.

VI. DETAILED DESCRIPTION

Generally, the present invention pertains to a radiation detection method and system using the SPRT for triggering an alarm or otherwise providing event notification in radiation detection equipment upon detecting an elevated background radiation event in a field of view. The basic purpose of the device is to provide a proximity alarm whenever a radiation source has entered the field of view (FOV) at a rate consistent with a vehicle traveling through the detection area. This is accomplished without the aid of a presence detector and with no predefined paths of travel.

For this purpose, it is appreciated that the present invention includes, or is adapted to operate in conjunction with one or more radiation sensors, such as for example, NaI, scintillator, or He3 neutron detector) which are capable of detecting neutrons and/or gammas and producing either simple gross counts or an energy spectrum. Thus the present invention may be incorporated into and utilized with radiation detectors, such as those on mobile platforms or at stationary installations, where a determination must be achieved to maximize range or maximize sensitivity. Sample applications include cargo monitoring, portal monitors, etc.

Figure 1:
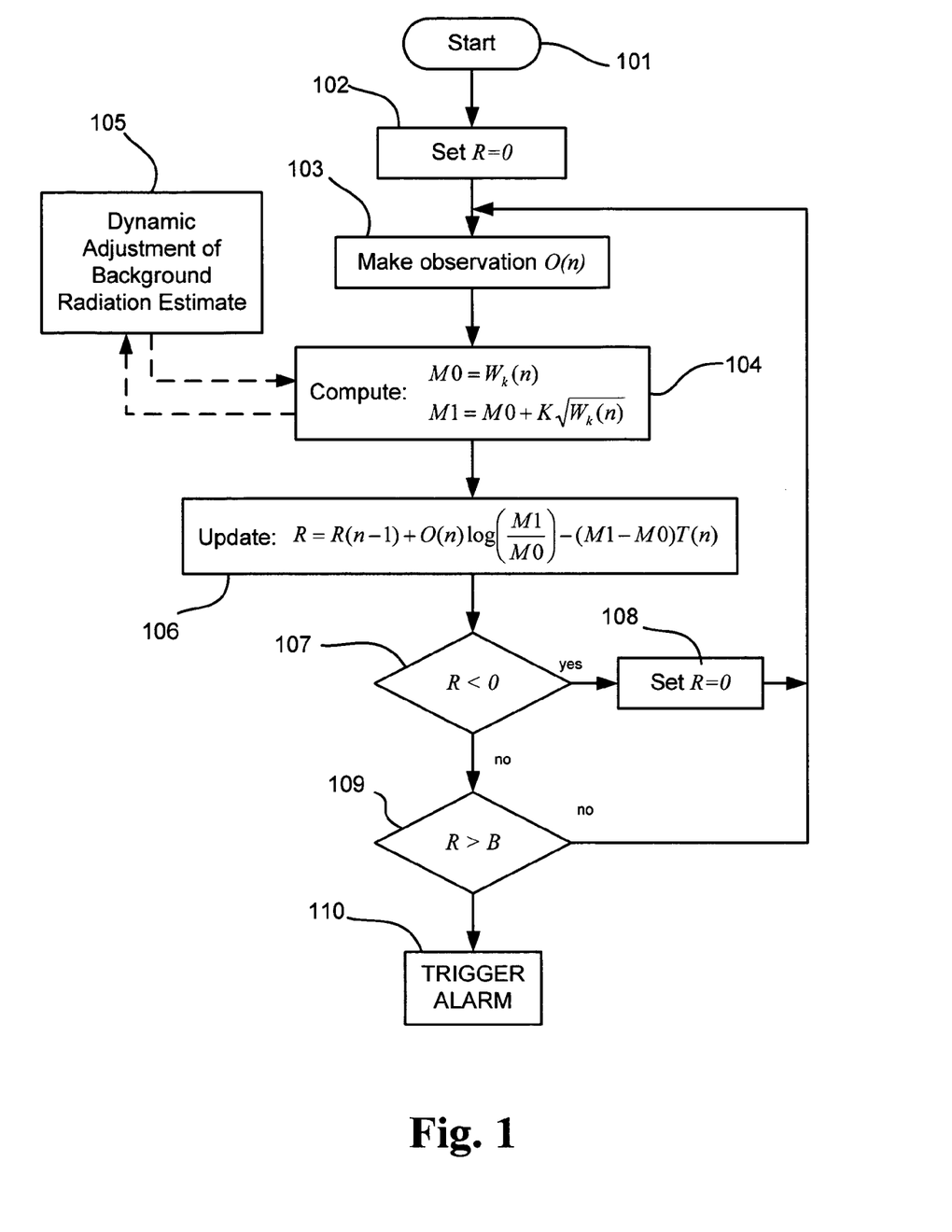

And in particular, the present invention is preferably operably connected to a data collection system (e.g. a multichannel analyzer, "MCA") which is connected to retrieve/collect data from the radiation sensor. And the data collection system preferably either collects data during regular intervals and reports the total gross counts during that interval along with the total time over which the sample was taken, or collects event mode data and reports the inter-arrival time between radiation events (here an event is, e.g., a single photon illuminating the detector). Data collection of background radiation preferably involves collecting data from the MCA and storing in a short-term history ring buffer. The length of this buffer (e.g. 20 seconds) controls the amount of delay between comparing the current samples and the estimated background. If there are no alarms during this time period, data that reaches the end of the ring buffer is transferred to the background estimate. The background estimate preferably comprises a ring buffer holding the number of samples (~2 min) sufficient for estimating the background. It will hold all time samples up to a pre-specified time excluding a period around an alarm. In this manner, each incoming sample is evaluated using the modified SPRT test of the present invention as shown in FIG. 1, using the current background estimate as given by the background estimate ring buffer described previously.

Furthermore, a mechanism for reporting the alarm to the user or central location, such as for example a communications device that communicates (e.g. by wireless communication) alarm events to a command center where security personnel can act on the alarm events. Also, a communications device may be included with the system that communicates alarms to, for example, a command center where security personnel can act. The remaining discussion will discuss exemplary embodiments of the computer methods and systems of the present invention for implementing the SPRT.

While SPRT is known and has been previously used for radiation detection applications, the modified SPRT method and system of the present invention enables the detection of slow-moving, weak, or distant sources given sufficient viewing time. This is because the present invention makes use of the likelihood ratio, R, that can build up over time, with small contributions from many different samples, even though no bin in and of itself would exceed the trigger threshold. In other words, since the SPRT algorithm is variable length, it enables the examination of larger and larger sequential windows such that the full contribution of the source may be realized even if at its maximum there is no chance of detection from a single time slice determination, so that it can locate a signal that would not otherwise be detectable using the standard algorithms. Simply put, the present invention leverages the minimization of time as applied to radiation detection for a real time system instead to maximize the range of detection. The result can be a substantial increase in detection range of a radiation proximity detector for some deployment scenarios under the conditions that a radiation source can be detected approaching along some unknown path without the aid of a presence detector.

Further, the false alarm rate produced by the algorithm of the present invention is insensitive to the background rate and thus a single set of parameters can work over a much larger range of operating conditions. And it can reduce the amount of required source material needed to trigger the portal by 25% while maintaining the same false alarm rate from background as traditional techniques. It is appreciated that each of the above described time periods can be adjusted to maximize detection for a particular site-specific scenario. Adjustment can be made, for example in a preferred embodiment, via Monte Carlo simulation.

The problem of dynamic background conditions is also addressed by providing mechanisms for estimating the dynamic background, adjusting the models to reflect the amount of background knowledge at the current point in time, analyzing the current sample using the models to determine statistical significance, and determining when the sample has returned to the expected background conditions. Additionally, the system and method serves to monitor the statistical test and record statistical limits reached during the alarm, background estimates prior to the start of the event, and the samples over which the trigger occurred.

Generally speaking, the SPRT minimizes the required number of samples for determining which model best represents the data to a required level of statistical confidence, by computing the following:

$$A < \prod_i \frac{f(O_i|\theta_i)}{f(O_i|\theta_0)} < B \qquad \text{(Eq. 1)}$$

where $$A = \frac{W_{0,1}}{1-W_{1,0}}, B = \frac{1-W_{1,0}}{W_{0,1}},$$

$f(O_i|\theta_j)$ is the probability observation $O_i$ coming from model $\theta_j$, and $W_{i,j}$ is the probability of declaring model i when really model j. The classic SPRT requires two probability models to be defined: $\theta_0$ the (null hypothesis) model representing samples from the background, and $\theta_1$, the (alternative hypothesis) model representing samples from the background plus the Minimum Detectable Signal (MDS). And the model $\theta_1$ is typically offset by a multiple of $\sigma_1$, from the background model. Taking the log of equation 1 produces:

$$\log A < \sum_i [\log f(O_i|\theta_i) - \log f(O_i|\theta_0)] < \log B \qquad \text{(Eq. 2)}$$

where $\log f(O_i|\theta_i) - \log f(O_i|\theta_0)$ is the log-likelihood contribution, R, of a sample observation, O(n). It is appreciated that in the context of radiation from nuclear decays, the time between one decay and the next is independent, and considered a Poisson distribution and process. Therefore, expressing Eq. 2 for a Poisson process produces:

$$\log A < \sum_i \left[ O_i \log\left(\frac{\lambda_1}{\lambda_0}\right) - (\lambda_1 - \lambda_0) \right] < \log B \quad \text{(Eq. 3)}$$

Therefore, the log-likelihood ratio contribution, $$O * \log\left(\frac{\lambda_1}{\lambda_0}\right) - (\lambda_1 - \lambda_0) * t,$$

for each new observation is added to the previous likelihood ratio contribution, to obtain the current likelihood ratio, expressed as follows after discretization from the continuous-time case:

$$R(n) = R + O(n) * \log\left(\frac{\lambda_1}{\lambda_0}\right) - (\lambda_1 - \lambda_0) * t \quad \text{(Eq. 4)}$$

Turning now to the drawings, FIG. 1 shows a first exemplary embodiment of the present invention illustrating the general process for performing a statistical test of the current sample based on the SPRT with enhancements. The statistical testing is performed on a computer processor for controlling and implementing the SPRT to determine a triggering event based on collected data, which can increase the range for proximity type radiation detectors (~40%).

The process starts at 101, and the log-likelihood ratio R is initially set to 0. Next at 103, an observation O(n) over the duration T(n) is made of the radiation. Next at 104, the first model M0 is taken as a background rate estimate, which can be a rolling window background rate estimate, a dynamic background rate estimate (see below), or a background rate estimate selected using the SPRT between two differently sized windows (see below). The second upper limit model M1 is taken as the background rate estimate plus some predefined offset. As shown in FIG. 1, the offset is preferably a parameter K, a sigma value, times the standard deviation of this background rate, i.e. square root of $W_k(n)$, where k indicates a one of the various ways of obtaining the current background estimation as disclosed herein.

As shown at 106, the log ratio of probability R for the current sample O(n) in the time interval T(n) is computed from these models and added to the previous log-likelihood ratio. It is notable with respect to the time T(n) shown used in step 106, one important aspect of the use of the present invention over other detection algorithms is that the false alarm from background is invariant to the time interval. That is for a given detection confidence (B) the rate of false alarms due to Poissonian background noise is constant regardless of the sampling of the data. This time invariant property allows for two features. First, the algorithm can handle dynamically changing intervals. Ideally, a system would be sampling data at a regular rate and thus each time interval is fixed. However, with radiation data after each incoming gamma ray the system is blinded for a short period of time. Thus data sampled at a regular interval is not in fact a constant interval. The time interval that we sampled our data is known as the "real time" of the measurement. The time interval for which the system was able to sample incoming photons is the "real time" minus all the dead times after each interaction and is thus called the "live time" (T(n)). When considering whether or not the rate of incoming photons is best represented by the background or the background plus a source, we will use this "live time" measurement as our time interval. One can go beyond this and say that this time invariant feature allows data to be collected at irregular intervals so long as the live time is known such as the conditions found in a software system where the sampling of the data is not well controlled without the need of any additional handling.

And another enhancement that this time independence allows is the use of small time intervals. For a traditional K-sigma technique the time intervals must be chosen large enough as to have sufficient statistics but not so large that as to be longer than the interval over which the source was present. Therefore, maximum sensitivity is only achieved if the source passes at the proper speed such that it arrives at the start of a sampling interval and leaves at the end of the same interval. These longer sampling windows cause problems because it is not known when the source would arrive. As a result traditional algorithms sample at a higher rate and then compute their triggers on a rolling window allowing for flexible arrival times. Using SPRT, this step becomes unnecessary. We simply sample at the higher rate and let the likelihood ratio to control the time interval over which the source will be considered. This allows for arbitrary arrival and departure times for the source. And in this regard, the enhancement of FIG. 3, steps 311-315 is used to determine the end time of the elevated triggering event. Thus the invariance in time allows the trigger algorithm to be independent of the velocity of the source.

After the ratio contribution is updated in step 106, the algorithm determines at 107 whether the ratio is less than 0. If yes, a background condition is indicated, the ratio is reset to 0 (at 108), and the system waits for new data, by returning control to step 103. In this regard, the SPRT used in the present invention is characterized as a resetting SPRT. It is also notable that the setting of A to zero (A=0) is consistent with the Cumulative Sum ("CUSUM") change detection test developed by Page in 1954 (Page, E. S. Continuous Inspection Schemes. *Biometrika*, 41, pp. 100-114.). The original intent of the test was to detect lax process control, which might be observed to cause more motors coming off a factory line to fail inspection as a trend over time, for example. In its simplest form, it is computed with a running summation of the difference of the data points from the mean/median average. More generally, the procedure defines a value $X_n = \max(0, X_{n-1} + W(X_n))$, where $W(X_n)$ is a weighting function based on the current observation. The CUSUM value cannot fall below zero, and once it exceeds a given threshold, the test signals the detection of a change. One of its important characteristics is that deviations from the mean tend to accumulate in the test, so that gradual changes as well as rapid changes are detected. Additionally, CUSUM is a form of sequential analysis, meaning that it can be employed to detect deviations from the null-hypothesis as the data is being collected. When the test is one-sided to detect change in one direction only, the CUSUM can be considered as represents a sequence of SPRT tests with initial score zero, and absorbing barriers at zero and h, with a new SPRT started each time the barrier at zero is crossed. And this similarity to SPRT exists when CUSUM uses log-likelihood ratio weighting like SPRT, which is the optimal CUSUM strategy for the fastest detection. Therefore, in the present inventions, A is set to equal 0. Thus the resetting SPRT of the present invention is closely related to the Page's CUSUM test.

If R is not less than 0 at step 107, then at 109 a determination is made whether the ratio R is greater than a predefined threshold (B). If no, then the sample is indeterminate and the system returns to step 103 and waits for new data. Otherwise, if R is greater than B, then a trigger condition occurs, as indicated by reference character 110, and an alarm is signaled if there is not currently an alarm.

Also shown in FIG. 1 is another exemplary embodiment of the present invention comprising a computer processor module for dynamically adjusting the background radiation estimate when performing a test of the current sample, indicated at reference character 105. In this case, the expected background is computed dynamically to account for the total knowledge of the current background estimate. In particular, the dynamic adjustment is performed by estimating the base rate to be used in subsequent calculations for the SPRT test, as the current rate estimate plus a parameter sigma times the standard deviation of the total counts in the estimate divided by the total time over which the background is estimated. This dynamic adjustment of background reduces the false alarms by increasing the background rate estimate when the length of time over the background is small. Dynamic adjustment operates to compensate for the error in a given background, i.e. where there is no background history, such as (1) during first start up when there is no background history, or (2) in a shielded background situation, e.g. after a vehicle leaves the field of view. In other words, dynamic adjustment is useful in situations where the background history is small/relatively few. As shown at 105 in FIG. 1 the dynamic adjustment is made to a background estimate, and subsequently set as the null hypothesis model, M0, in step 104.

The dynamic adjustment reflects the fact that while knowledge of the background model is imperfect, knowledge of the background does increase over time with added samples. And while variance in the background estimate is somewhat accounted for by introducing a parameter $\sigma_0$ to offset the mean of the background model $\theta_0$ from the current background estimate (by default, $\sigma_0=1$), it is undesirable, however, that this offset be a constant based solely on the background rate. This is because the estimator variance should decrease with an increasing number of observations contributing to the background. According to probability models used for the SPRT, we have the following time-normalized Poisson parameters:

$$\lambda_0 = \frac{c_b}{t_b} + \sigma_0 \sqrt{\frac{c_b}{t_b}} \text{ and } \lambda_1 = \frac{c_b}{t_b} + \sigma_1 \sqrt{\frac{c_b}{t_b}} \quad \text{(Eq. 5)}$$

where $C_b$ is the number of counts in the trigger background and $t_b$ is the length of time accumulated in the background, and dimensional compatibility implies that the sigma values have units of $\sqrt{\text{counts/time}}$ and are therefore rate sigmas. However, in order to make the effective $\sigma_0$ decrease with increasing background time, $\sigma_0$ is divided by its square root as follows:

$$\lambda_0 = \frac{c_b}{t_b} + \left(\frac{\sigma_0}{\sqrt{t_b}}\right)\sqrt{\frac{c_b}{t_b}} = \frac{c_b}{t_b} + \sigma_0 \frac{\sqrt{c_b}}{t_b} \quad \text{(Eq. 6)}$$

Thus, the base rate, $\lambda_0$, (to be used in further SPRT calculations for analyzing a sample) is estimated as the current background rate estimate $$\frac{c_b}{t_b},$$

plus a parameter sigma divided by the total time over which the background is estimated.

It is appreciated, however, that if only $\theta_0$ is adjusted, its relative distance to model $\theta_1$ changes over time, causing the error rates of the test to vary as well. Since SPRT has analytically defined error rates, this behavior may be avoided by offsetting, $\theta_1$ from $\theta_0$ instead of the background estimate. If it were offset by multiples of the standard deviation of $\theta_0$, it would introduce an undesirable non-linear dependence between the two models (and hence their parameters). The following definition leads to only a linear dependence between the sigma constants:

$$\lambda_1 = \lambda_0 + \sigma_1 \sqrt{\frac{c_b}{t_b}} \quad \text{(Eq. 7)}$$

We can then derive effective sigmas from these equations in terms of the constants actually supplied:

$$\lambda_1 = \lambda_0 + \sigma_1 \sqrt{\frac{c_b}{t_b}} \quad \text{(Eq. 8)}$$

$$= \left(\frac{c_b}{t_b} + \left(\frac{\sigma_0}{\sqrt{t_b}}\right)\sqrt{\frac{c_b}{t_b}}\right) + \sigma_1 \sqrt{\frac{c_b}{t_b}}$$

$$= \frac{c_b}{t_b} + \left(\frac{\sigma_0}{\sqrt{t_b}} + \sigma_1\right)\sqrt{\frac{c_b}{t_b}}.$$

Compare to the original statements of $\lambda_0$ and $\lambda_1$ and note that we obtain:

$$\sigma_{0,\text{effective}} = \left(\frac{\sigma_0}{\sqrt{t_b}}\right) \text{ and } \sigma_{1,\text{effective}} \quad \text{(Eq. 9)}$$

$$= \left(\frac{\sigma_0}{\sqrt{t_b}} + \sigma_1\right)$$

$$= \sigma_{0,\text{objective}} + \sigma_1$$

In other words:

$$\sigma_{1,\text{effective}} - \sigma_{0,\text{effective}} = (\sigma_{0,\text{effective}} + \sigma_1) - \sigma_{0,\text{effective}} = \sigma_1 \quad \text{(Eq. 10)}$$

Two important conclusions from the above is, first, that the distance between the two models is constant throughout the test and equal to the sigma supplied. And second, with increasing observation time accumulated in the background, the effect of the offset of $\theta_0$ diminishes, and the test more and more closely approximates the original SPRT that lacks this adjustment.

This dynamic adjustment can affect the log-likelihood ratio at a given point in time as follows. The ratio for a sample is given by:

$$O * \log\left(\frac{\lambda_1}{\lambda_0}\right) - (\lambda_1 - \lambda_0) * t \qquad \text{(Eq. 11)}$$

where it is observed that:

$$(\lambda_1 - \lambda_0) = \left(\lambda_0 + \sigma_1 \sqrt{\frac{c_b}{t_b}}\right) - \lambda_0 \qquad \text{(Eq. 12)}$$

$$= \sigma_1 \sqrt{\frac{c_b}{t_b}}$$

which should be relatively constant over time (since the sigma value is a given and the background rate estimate shouldn't vary greatly. On the other hand, the argument for the logarithm is:

$$\left(\frac{\lambda_1}{\lambda_0}\right) = \left(\frac{\lambda_0 + \sigma_1 \sqrt{c_b/t_b}}{\lambda_0}\right) \qquad \text{(Eq. 13)}$$

$$= 1 + \sigma_1 \sqrt{\frac{c_b}{t_b}} \left(\frac{t_b}{c_b + \sigma_0 \sqrt{c_b}}\right)$$

$$= 1 + \sigma_1 \left(\frac{\sqrt{t_b}}{\sqrt{c_b} + \sigma_0}\right)$$

Although the relationship is fairly complicated, it is evident that the ratio contribution of an observation is de-emphasized when there are low counts and time in the background, where the addition of $\sigma_0$ in the denominator is more significant. This is desirable, since we wish to place more weight on those observations taken with well-defined models.

Figure 2:
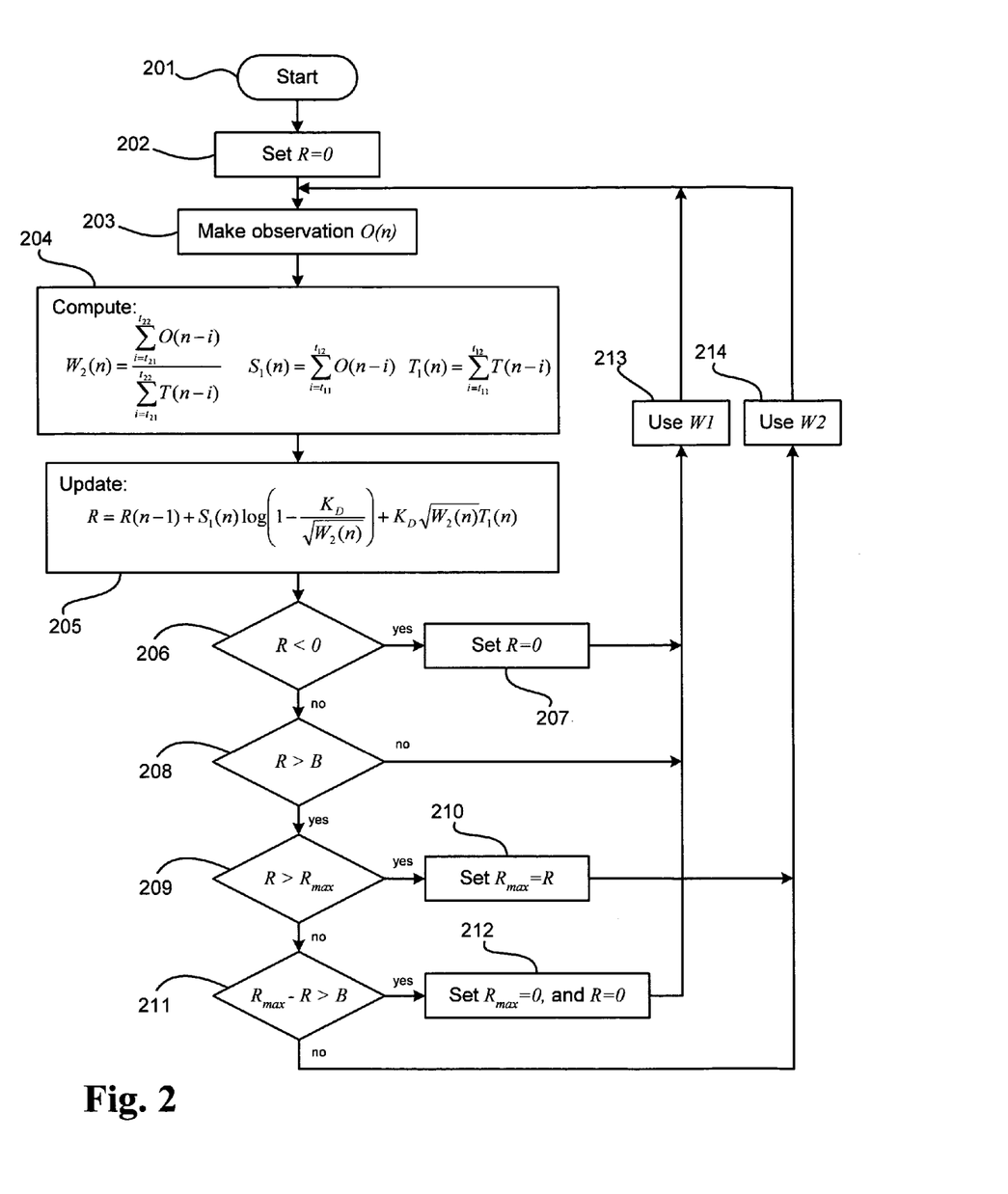
FIG. 2 is a flow chart diagram of a second exemplary embodiment of the present invention, and in particular a preliminary method of selecting between two differently sized windows for use as a sampled background radiation estimate in subsequent testing of current samples to determine its statistical significance between two models.

In FIG. 2, another computer processor module and process of the present invention is shown, for computing and selecting an estimate of the background radiation between two rolling windows of differing size. In particular, this computer processor module operates to perform background occlusion detection and compensation, referring to a lowering of the background level as viewed by the system caused by a shielding object that moves into the field-of-view of the detector(s). Background occlusion is an issue arising in common usage scenarios, such as for example roadside monitoring in an urban environment, which can potentially lead to inaccurate background estimates, false alarms and oscillatory behavior in the detection system. Deployment experience suggests that there are numerous contexts in which the effect is not negligible. Therefore, the present invention employs a method to detect and compensate for background occlusion.

In particular the method of the present invention analyzes the short background estimate compared to the long background, looking for a "drop-out" of the count rate. The SPRT is used in the present invention to decide whether it is more likely that a merely statistical deviation from background is being observed, or that the background view itself has changed. When an occlusion condition has been established by the test, the long background average is used instead of the short background average it normally uses. This is accomplished by holding a set of previous samples taken over the period prior to the current sample. In particular, the total number of counts is computed over a first rolling window (W1) prior to the current sample. And the total number of counts is computed over a larger rolling window (W2) prior to the current sample, excluding periods where a trigger has occurred. These estimates may have different offset from the current sample by a delay to avoid matching the rise in the sample. An important function of this module is to determine which background estimate is currently the applicable one to the conditions. In this module, a modified SPRT algorithm is implemented, where for example, "Model0" is defined as the rate estimate computed from W2, and "Model1" is defined as the rate estimate from W2 minus KD times the square root of rate estimate from W2.

As shown in FIG. 2, the process starts at 201, and R is set to 0 at step 202. Next at 203, an observation O(n) is made of the background radiation. At 204 the module computes the values for the first window W1 and the second larger window W2. It is notable that W2(n)=S2(n)/T2(n), and W1(n)=S1(n)/T1(n). Step 204 only shows computation requirements for W2(n), S1(n), and T1(n), because those values are directly used in the following step 205. It is appreciated, however, that in step 204, the background radiation estimates of both W1 and W2 are computed. At step 205, the total counts from W1 and the length of W1 are tested against the models to form a log-likelihood ratio which is added to the previous ratio, and the maximum of this ratio is tracked. This is indicated by the formula shown in 205.

Next, at step 206, a determination is made whether the current ratio, R, is less than 0. If yes, then it is bound at 0 as indicated by setting R=0 at step 207. In this case, W1 is used as the background radiation estimate, as shown at 213, and the process returns to 203 for another sampling. It is notable that setting R=0 is again consistent with Page's CUSUM discussed above. At step 208, if R is not greater than B, then it is indeterminate and the background rate computed for W1 is used as the current background estimate. If at step 208, R is greater than B, then at step 208, a determination is made whether R is greater than a maximum of R, i.e. $R_{max}$. It is appreciated for this process that $R_{max}$ is tracked. This is accomplished in part at step 210, where if R is determined to be greater than the current $R_{max}$ then R is set as the new $R_{max}$, after which W2 is used as the current background estimate. If R is not greater than $R_{max}$ then at step 211 a determination is made whether the current ratio, R, is less than the maximum ratio by a predefined threshold, B. If yes, then both the current ratio and the maximum are reset to 0 at step 212, and W1 is used. If not, however, R is not less than the maximum ratio by B, then W2 is used as shown at 214. It is notable that the maximum ratio is tracked for this selection process.

Figure 3:
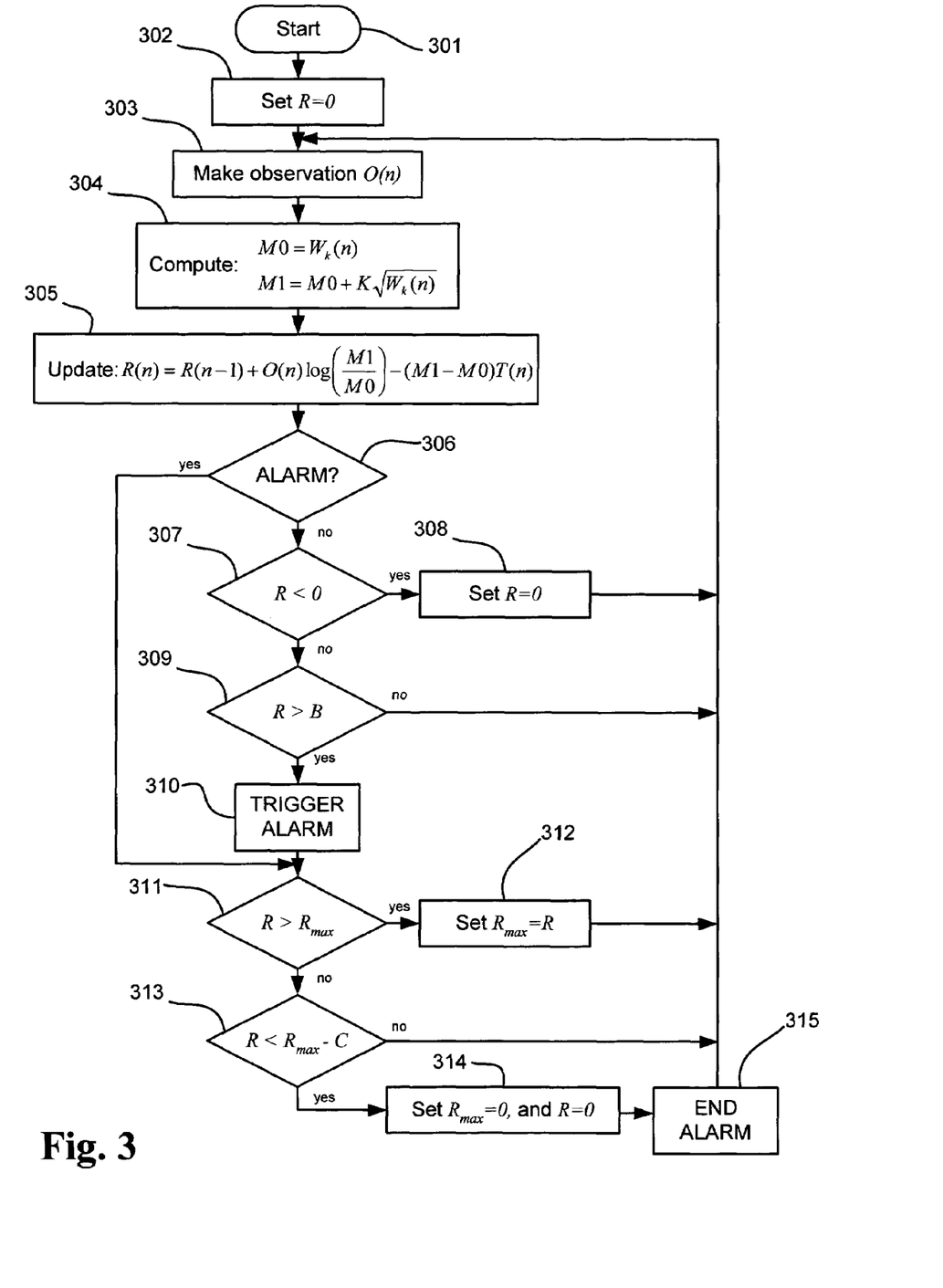
FIG. 3 is a flow chart diagram of a third exemplary embodiment of the present invention, and in particular including an enhanced process for determining when to end the trigger state.

FIG. 3 shows another preferred embodiment of the present invention similar to the process shown in FIG. 1, but with an additional mechanism for ending a currently triggered alarm. As shown in FIG. 3, the process begins at 301, and R is initially set to equal 0 at step 302. Observation O(n) is made at step 303 of the background radiation. Computations are made at step 304 to set the estimates for the lower model M0 and the upper model M1. It is appreciated that the choice of selection between W1 and W2 in the previous discussion may be used here. Or the dynamically adjusted background estimate also previously discussed may be used here. Or simply a single rolling background estimate may be used. In any case, the likelihood ratio R(n) is updated with the ratio contribution from each observation at step 305.

Since the goal is to end a triggered alarm, step 306 first determines whether an alarm is currently in a triggered stated. If no, then the steps 307-310 are followed, which are similar to steps 107-110 of FIG. 1. If however, the alarm is currently in a triggered state, control is given to step 311 where a determination is made whether R is greater than $R_{max}$, which is being tracked. If R is greater than $R_{max}$ then $R_{max}$ is set to R at step 312, and the process is repeated by transferring control back to step 303 to update with a new sampling. If R is not greater than $R_{max}$, then a determination is made at step 313 whether the current ratio R is less than the maximum ratio $R_{max}$ by a parameter C. If yes, then both the ratio R and maximum $R_{max}$ are reset to 0, and the trigger status of the alarm is terminated at step 315. After ending the alarm, control is again transferred back to step 303 where a next observation can be made.

It is notable that the additional steps 311-315 allow the full capture of the signal as the source passes. And the new parameter C added to the SPRT trigger algorithm is not simply to adjust its statistical properties, but to also allow it to more accurately describe the region in time associated with an event. During an event, the test as described above would build up the ratio value until it reaches the so-called "absorbing barrier" of B, at which point the test would reset. This is undesirable, however, the trigger state is used to determine what interval to accumulate for isotopic analysis, and as described, would lose much of the information contained in the second half of the event. The solution is not to wait until the ratio returns to A, however, since this would pose the opposite problem: it would dilute the sample with too much background from the tail of the event. Therefore, a parameter C is introduced that represents how far the log-likelihood ratio must fall from B before the trigger state is cleared. This solution both allows for the proper interval to be marked and dispatched for isotopic analysis, as well as for the trigger algorithm to reset at the appropriate time.

If the outcome of a SPRT test in steps 306-310 is an alarm, the system preferably continues the SPRT until such time as the outcome of the test has not yielded an alarm result for a prespecified (1 s) period of time, or the alarm termination state has not been reached during a prespecified period (2 min). Furthermore, under either situation the data gathered starting from the first time slice that lead to alarm result to the last time slice that concluded a result may be packaged into an event report that is transmitted back to a command center or other predefined reporting location (not shown).

While particular operational sequences, materials, temperatures, parameters, and particular embodiments have been described and or illustrated, such are not intended to be limiting. Modifications and changes may become apparent to those skilled in the art, and it is intended that the invention be limited only by the scope of the appended claims.

We claim:

1. A method for detecting an elevated level of background radiation, comprising:
    obtaining a current sample using a radiation detector;
    computing at least one background radiation estimate(s);
    setting one of the at least one background radiation estimate(s) ($W_k(n)$) as a first model (M0), and the combination of M0 and an offset as a second model (M1);
    using the SPRT to test the current sample against M0 and M1 to produce a log-likelihood ratio contribution of the current sample;
    updating the log-likelihood ratio by adding the log-likelihood ratio contribution to a previous log-likelihood ratio; and
    upon determining that the updated log-likelihood ratio (R) is greater than a predefined upper limit threshold (B), triggering an alarm indicating an elevated level of background radiation.

2. The method of claim 1,
    wherein the offset is $K\sqrt{W_k(n)}$ such that $M1=M0+K\sqrt{W_k(n)}$, where K is a predefined sigma value.

3. The method of claim 1, further comprising:
    upon determining that R<0, setting R=0 and repeating the steps of claim 1.

4. The method of claim 1, further comprising:
    upon determining that R is not less than zero and not greater than B, repeating the steps of claim 1.

5. The method of claim 1, further comprising:
    tracking the maximum of the updated log-likelihood ratio ($R_{max}$) by comparing R with $R_{max}$.

6. The method of claim 5,
    wherein, upon determining that $R<R_{max}-C$ where C is a predefined offset, ending the triggered alarm, setting $R_{max}=0$ and R=0, and repeating the steps in claim 1.

7. The method of claim 5,
    wherein, upon determining that $R>R_{max}$, then setting $R_{max}=R$, and repeating the steps in claim 1 without ending the triggered alarm.

8. The method of claim 5,
    wherein, upon determining that R is not greater than $R_{max}$ and not less than $R_{max}-C$, repeating the steps in claim 1 without ending the triggered alarm.

9. The method of claim 1,
    wherein the step of computing at least one background radiation estimate(s) comprises increasing a sampled background radiation estimate to a dynamic background radiation estimate which is estimated as the sampled background radiation estimate plus a parameter (sigma) times the standard deviation of the total counts in the estimate divided by the total time over which the background is estimated, and with said dynamic background estimate set as M0.

10. The method of claim 1,
    wherein the step of computing at least one background radiation estimate(s) comprises:
    computing the total number of counts over a first rolling window (W1) prior to the current sample, and the total number of counts over a second rolling window (W2) larger than W1 prior to the current sample and excluding periods where a trigger occurred; and
    using the SPRT to determine which of W1 and W2 is the more statistically significant background radiation estimate for use as a current background estimate to be set as M0.

11. The method of claim 10,
    wherein the more statistically significant background radiation estimate between W1 and W2 is determined by:
    setting W2 as a first model (M0), and W2' as a second model (M1), where W2' is the combination of W2 and an offset;
    using the SPRT to test W1 against M0 and M1 to produce a log-likelihood ratio contribution of W1;
    updating the log-likelihood ratio (R) by adding the log-likelihood ratio contribution to a previous log-likelihood ratio, and tracking the maximum of the updated log-likelihood ratio (Rmax); and
    selecting, based on the value of R, either W1 or W2 as the sampled background radiation estimate.

12. A method for obtaining a statistically significant background radiation estimate for use in radiation detection, comprising:
    controlling a radiation detector to obtain a current sample;
    computing the total number of counts over a first rolling window (W1) prior to the current sample, and the total number of counts over a second rolling window (W2)

larger than W1 prior to the current sample and excluding periods where a trigger occurred; and using the SPRT to determine which of W1 and W2 is the more statistically significant background radiation estimate for use as a sampled background estimate against which a sample observation may be compared to determine a triggering event.

13. The method of claim 12,
wherein the more statistically significant background radiation estimate between W1 and W2 is determined by:
  setting W2 as a first model (M0), and W2' as a second model (M1), where W2' is the combination of W2 and an offset;
  using the SPRT to test W1 against M0 and M1 to produce a log-likelihood ratio contribution of W1;
  updating the log-likelihood ratio (R) by adding the log-likelihood ratio contribution to a previous log-likelihood ratio, and tracking the maximum of the updated log-likelihood ratio (Rmax); and
  selecting, based on the value of R, either W1 or W2 as the sampled background radiation estimate.

14. The method of claim 13,
wherein the offset of W2' is $-K_D\sqrt{W2}$ such that W2'= $W2-K_D\sqrt{W2}$, where $K_D$ is a predefined sigma value.

15. The method of claim 13,
wherein if R is less than 0, then R is set to 0, and W1 is selected.

16. The method of claim 13,
wherein if R is not greater than B, then W1 is selected, where B is a predefined threshold.

17. The method of claim 13,
wherein if R is greater than $R_{max}$, then $R_{max}$ is set to R, and W2 is selected.

18. The method of claim 13,
wherein if $R_{max}-R$ is not greater than B, then W2 is selected.

19. The method of claim 13,
wherein if $R_{max}-R>B$, then $R_{max}$ is set to 0, R is set to 0, and W1 is selected.

20. The method of claim 13,
wherein, upon selecting either W1 or W2, the steps of claim 1 are repeated to obtain a new W1 and a new W2 and determine which one of the new W1 and new W2 is the more statistically significant background radiation estimate for use as a current background estimate against which a sample observation may be compared to determine a triggering event.

21. A method for clearing a currently triggered state of a radiation detection system of a type using SPRT analysis to update a log-likelihood ratio (R) based on a ratio contribution of a sample observation, comprising:
  tracking the maximum ($R_{max}$) of the updated log-likelihood ratio R; and
  upon a determination that $R<R_{max}-C$ where C is a predefined value, ending the triggered state and resetting the SPRT.

22. The method of claim 21,
wherein the step of resetting the SPRT includes setting $R_{max}=0$ and R=0, and repeating the steps in claim 1.

23. The method of claim 21,
further comprising, upon a determination that $R<R_{max}-C$ where C is a predefined value, capturing the interval between the most recent reset time and $R_{max}$, for isotopic analysis of the interval.

24. A computer program product comprising:
A computer useable medium and computer readable code embodied on said computer useable medium for causing a detection of an elevated level of background radiation, the computer readable code comprising:
  computer readable program code means for causing a computer to obtain a current sample using a radiation detector;
  computer readable program code means for causing a computer to compute at least one background radiation estimate(s);
  computer readable program code means for causing a computer to set one of the at least one background radiation estimate(s) ($W_k(n)$) as a first model (M0), and the combination of M0 and an offset as a second model (M1);
  computer readable program code means for causing a computer to use the SPRT to test the current sample against M0 and M1 to produce a log-likelihood ratio contribution of the current sample;
  computer readable program code means for causing a computer to update the log-likelihood ratio by adding the log-likelihood ratio contribution to a previous log-likelihood ratio; and
  computer readable program code means for causing a computer to, upon determining that the updated log-likelihood ratio (R) is greater than a predefined upper limit threshold (B), triggering an alarm indicating an elevated level of background radiation.

25. A computer program product comprising:
A computer useable medium and computer readable code embodied on said computer useable medium for causing a statistically significant background radiation estimate to be obtained for use in radiation detection, the computer readable code comprising:
  computer readable program code means for causing a computer to control a radiation detector to obtain a current sample;
  computer readable program code means for causing a computer to compute the total number of counts over a first rolling window (W1) prior to the current sample, and the total number of counts over a second rolling window (W2) larger than W1 prior to the current sample and excluding periods where a trigger occurred; and
  computer readable program code means for causing a computer to use the SPRT to determine which of W1 and W2 is the more statistically significant background radiation estimate for use as a sampled background estimate against which a sample observation may be compared to determine a triggering event.

26. A computer program product comprising:
a computer useable medium and computer readable code embodied on said computer useable medium for causing the clearing of a currently triggered state of a radiation detection system of a type using SPRT analysis to update a log-likelihood ratio (R) based on a ratio contribution of a sample observation, the computer readable code comprising:
computer readable program code means for causing a computer to track the maximum ($R_{max}$) of the updated log-likelihood ratio R; and
computer readable program code means for causing a computer to, upon a determination that $R<R_{max}-C$ where C is a predefined value, end the triggered state and reset the SPRT.

27. A computer system for detecting an elevated level of background radiation, comprising:
- a first processor module that obtains current sample data from a radiation detector;
- a second processor module that computes at least one background radiation estimate(s);
- a third processor module that sets one of the at least one background radiation estimate(s) ($W_k(n)$) as a first model (M0), and the combination of M0 and an offset as a second model (M1);
- a fourth processor module that uses the SPRT to test the current sample against M0 and M1 to produce a log-likelihood ratio contribution of the current sample;
- a fifth processor module that updates the log-likelihood ratio by adding the log-likelihood ratio contribution to a previous log-likelihood ratio; and
- a sixth processor module that, upon determining that the updated log-likelihood ratio (R) is greater than a predefined upper limit threshold (B), triggers an alarm indicating an elevated level of background radiation.

28. A computer system for obtaining a statistically significant background radiation estimate for use in radiation detection, comprising:
- a first processor module for controlling a radiation detector to obtain a current sample;
- a second processor module for computing the total number of counts over a first rolling window (W1) prior to the current sample, and the total number of counts over a second rolling window (W2) larger than W1 prior to the current sample and excluding periods where a trigger occurred; and
- a third processor module using the SPRT to determine which of W1 and W2 is the more statistically significant background radiation estimate for use as a sampled background estimate against which a sample observation may be compared to determine a triggering event.

29. A computer system for clearing a currently triggered state of a radiation detection system of a type using SPRT analysis to update a log-likelihood ratio (R) based on a ratio contribution of a sample observation, comprising:
- a first processor module for tracking the maximum ($R_{max}$) of the updated log-likelihood ratio R; and
- a second processor module that, upon a determination that $R < R_{max} - C$ where C is a predefined value, ends the triggered state and resetting the SPRT.

* * * * *